(12) United States Patent
Hirano

(10) Patent No.: US 9,249,741 B2
(45) Date of Patent: Feb. 2, 2016

(54) ENGINE AUTOMATIC STOPPING DEVICE AND ENGINE AUTOMATIC STOPPING METHOD

(75) Inventor: Masahiro Hirano, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 277 days.

(21) Appl. No.: 13/811,500

(22) PCT Filed: Jul. 22, 2011

(86) PCT No.: PCT/JP2011/066702
§ 371 (c)(1),
(2), (4) Date: Jan. 22, 2013

(87) PCT Pub. No.: WO2012/011568
PCT Pub. Date: Jan. 26, 2012

(65) Prior Publication Data
US 2013/0131966 A1    May 23, 2013

(30) Foreign Application Priority Data

Jul. 23, 2010 (JP) .................................. 2010-165712

(51) Int. Cl.
*F02D 28/00* (2006.01)
*F02D 17/00* (2006.01)
*F02D 29/02* (2006.01)

(52) U.S. Cl.
CPC ................ *F02D 28/00* (2013.01); *F02D 17/00* (2013.01); *F02D 29/02* (2013.01)

(58) Field of Classification Search
CPC ....... F02D 29/02; F02D 11/105; F02D 17/00; F02D 2041/001; F02D 2041/1412; F02D 2041/1433; F02D 29/00; F02D 41/005; F02D 41/123; F02D 17/02; F02D 17/04; F02D 2009/0245; F02D 2041/2003; F02D 2041/228; F02D 2200/60; F02D 2250/18; F02D 2250/41; F02D 29/04; F02D 35/00; F02D 35/02; F02D 41/0002; F02D 41/0007; F02D 41/20; F02D 41/22; F02D 41/221
See application file for complete search history.

(56) References Cited

U.S. PATENT DOCUMENTS 6,504,259 B1 * 1/2003 Kuroda et al. ............... 290/40 C
8,382,642 B2 * 2/2013 Saito et al. .................... 477/185
(Continued)

FOREIGN PATENT DOCUMENTS

| JP | 2007-270774 A |   | 10/2007 |
| JP | 2008-14193 A |   | 1/2008 |
| JP | 2008014193 A | * | 1/2008 |

OTHER PUBLICATIONS

Reference Furuhashi (JP 2008014193) Machine Translation.*
(Continued)

*Primary Examiner* — Hung Q Nguyen
*Assistant Examiner* — Brian P Monahon
(74) *Attorney, Agent, or Firm* — Foley & Lardner LLP

(57) ABSTRACT

An internal combustion engine (2) of a vehicle (1A, 1B) is automatically stopped when a first automatic stopping condition is established while the vehicle is stationary or a second automatic stopping condition is established while the vehicle travels. The first automatic stopping condition requires a road gradient equal to or smaller than a first gradient threshold, and the second automatic stopping condition requires the road gradient equal to or smaller than a second gradient threshold. By setting the second gradient threshold at a smaller value than the first gradient threshold, a feeling of unease experienced by a driver when the engine is stopped on a slope is reduced.

8 Claims, 6 Drawing Sheets

(56) References Cited

U.S. PATENT DOCUMENTS

| | | | |
|---|---|---|---|
| 8,712,673 B2* | 4/2014 | Gwon et al. ................... | 701/112 |
| 2003/0004635 A1* | 1/2003 | Kamiya ............... | B60K 41/202 |
| | | | 701/112 |
| 2005/0140208 A1* | 6/2005 | Ji ................................. | 303/192 |
| 2008/0083390 A1* | 4/2008 | Nishikiori ............. | F02D 41/042 |
| | | | 123/179.4 |
| 2008/0168964 A1* | 7/2008 | Kimura ........... | B60W 30/18136 |
| | | | 123/325 |
| 2009/0048063 A1* | 2/2009 | Silveri ................... | B60K 6/485 |
| | | | 477/3 |
| 2010/0042311 A1* | 2/2010 | Nakai ........................... | 701/112 |
| 2010/0076656 A1* | 3/2010 | Hiyoshi et al. .................. | 701/70 |
| 2010/0167874 A1* | 7/2010 | Shirasaka ........... | F16H 61/0021 |
| | | | 477/86 |
| 2010/0305838 A1* | 12/2010 | Yamamura et al. ........... | 701/113 |
| 2011/0046864 A1* | 2/2011 | Kamiya ........................ | 701/102 |
| 2011/0256980 A1* | 10/2011 | Saito ..................... | B60W 10/06 |
| | | | 477/183 |

OTHER PUBLICATIONS

Reference Furuhashi (JP 2008014193) Drawings.*

* cited by examiner

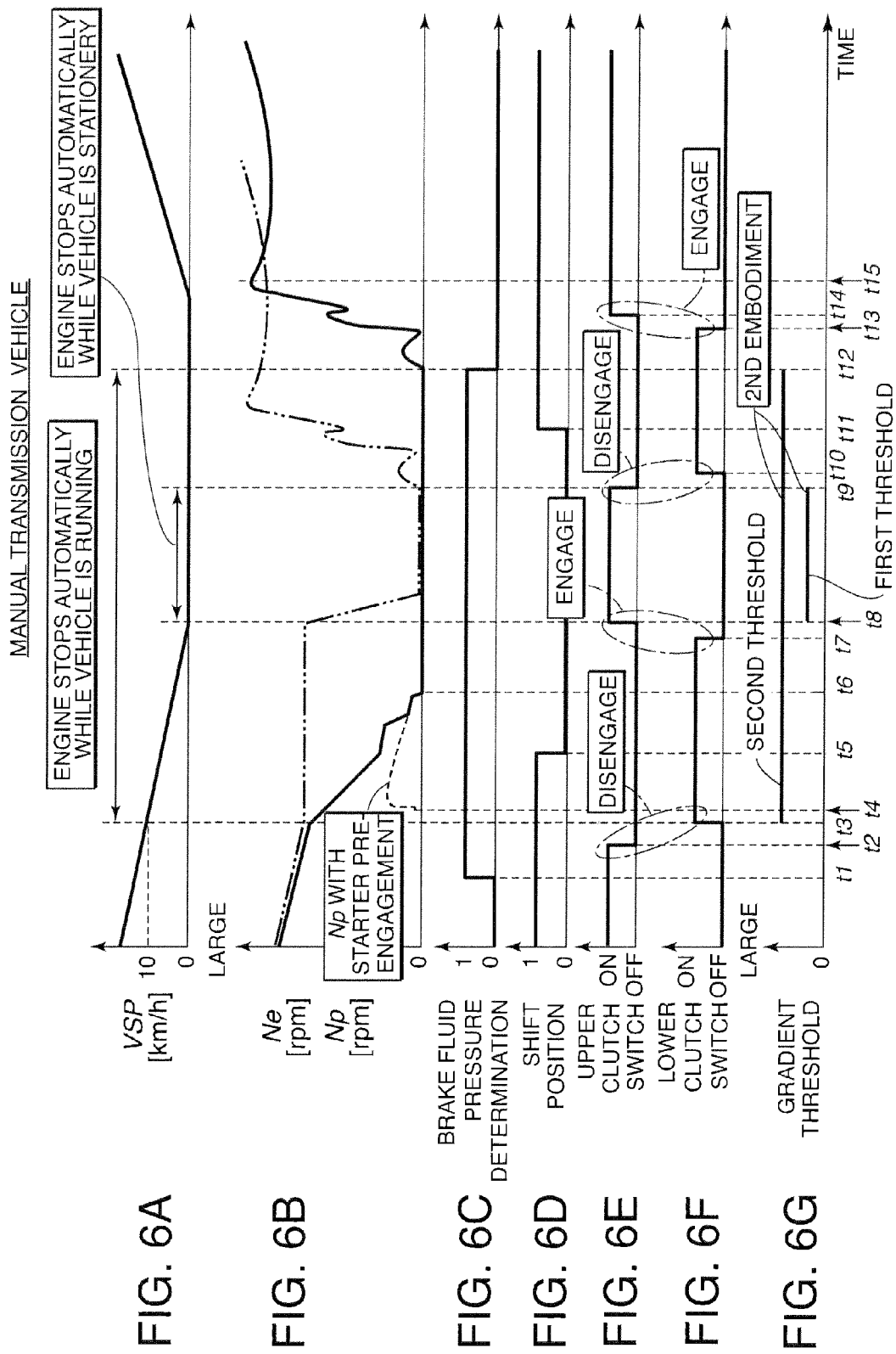

ENGINE AUTOMATIC STOPPING DEVICE AND ENGINE AUTOMATIC STOPPING METHOD

FIELD OF THE INVENTION

This invention relates to automatic stopping and restarting of an internal combustion engine for a vehicle.

BACKGROUND OF THE INVENTION

Japanese Patent Application Publication No. 2008-14193, published by the Japan Patent Office in 2008, proposes an engine automatic stopping device that automatically stops an internal combustion engine when a predetermined condition is established while a vehicle is either traveling or stationary.

This prior art proposes that automatic stopping of the internal combustion engine be prohibited when an uphill gradient of a road equals or exceeds a predetermined value to prevent the vehicle from rolling back.

SUMMARY OF THE INVENTION

In this prior art, in order to increase opportunities for automatically stopping the internal combustion engine, the internal combustion engine is automatically stopped when the predetermined condition is established not only while the vehicle is stationary but also while the vehicle travels. In a vehicle comprising a torque converter and an automatic transmission, for example, creep torque cannot be obtained, and therefore a deceleration sensation increases. In this case, the deceleration sensation experienced by a driver increases as the gradient increases, and as a result, the driver may experience a feeling of unease.

It is therefore an object of this invention to reduce a feeling of unease experienced by a driver when an internal combustion engine is automatically stopped on a slope.

In order to achieve the object described above, this invention provides an engine automatic stopping device for an internal combustion engine of a vehicle. The device is configured to automatically stop the internal combustion engine when a first automatic stopping condition is established while the vehicle is stationary, and automatically stop the internal combustion engine when a second automatic stopping condition is established while the vehicle travels.

The first automatic stopping condition requires a road gradient equal to or smaller than a first gradient threshold, and the second automatic stopping condition requires the road gradient equal to or smaller than a second gradient threshold. The second gradient threshold is set at a smaller value than the first gradient threshold.

The details as well as other features and advantages of this invention are set forth in the remainder of the specification and are shown in the accompanying drawings.

BRIEF DESCRIPTION OF THE DRAWINGS

FIGS. 6A to 6G are timing charts illustrating operation states of the internal combustion engine controlled by the automatic stopping device according to the second embodiment of this invention.

EMBODIMENTS OF THE INVENTION

Figure 1:
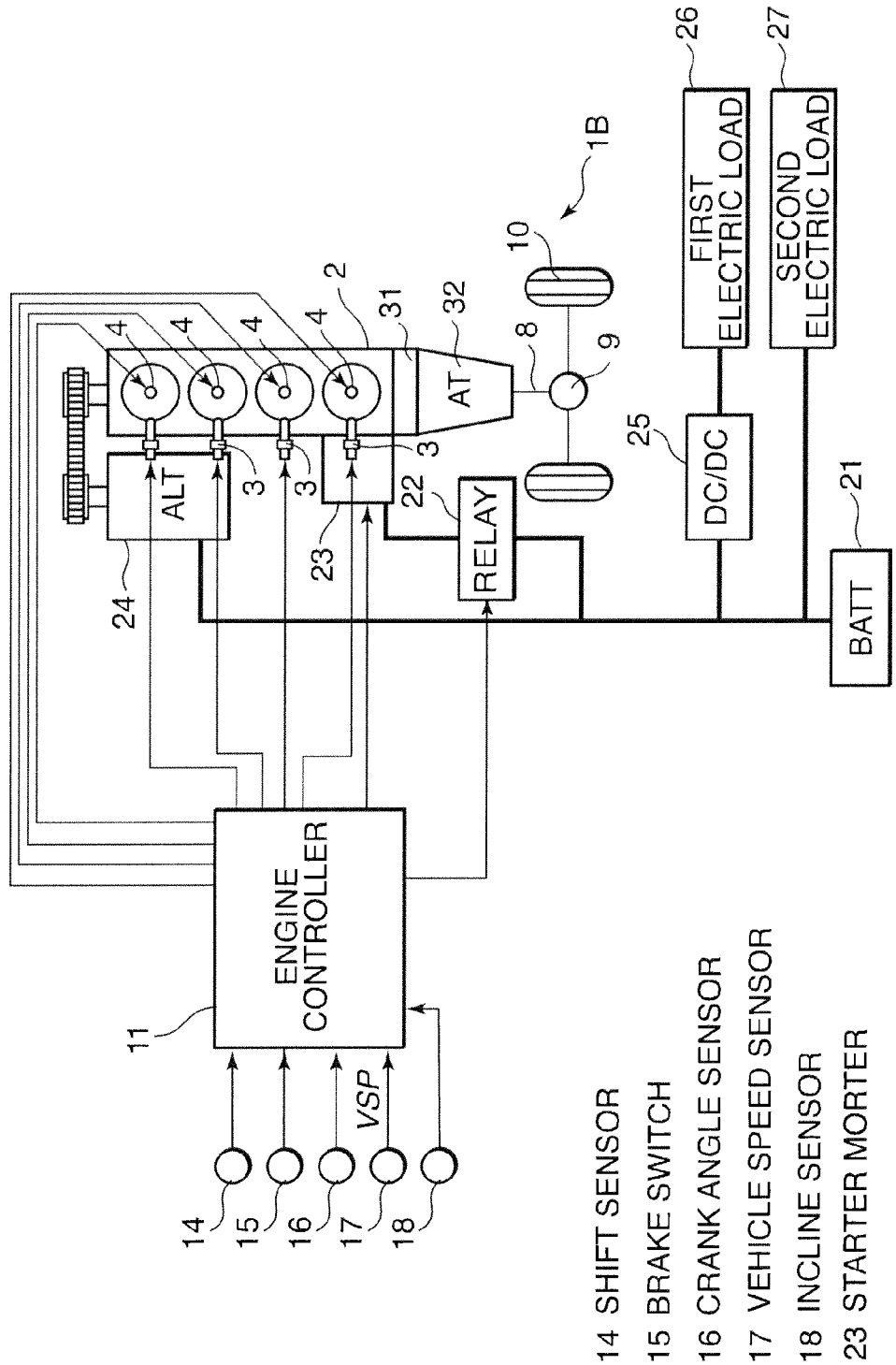
FIG. 1 is a schematic diagram of an automatic stopping device for an internal combustion engine according to a first embodiment of this invention.

Referring to FIG. 1 of the drawings, a multi-cylinder internal combustion engine 2 installed in a vehicle 1B comprises a fuel injector 3 and a spark plug 4 provided for each cylinder. In each cylinder of the internal combustion engine 2, fuel supplied from the fuel injector 3 is ignited by the spark plug 4 and burned, whereupon resulting combustion pressure is converted into rotary force, or in other words power.

The internal combustion engine 2 is connected to an automatic transmission 32 via a torque converter 31. Power transmitted to the automatic transmission 32 from the internal combustion engine 2 is transmitted to a drive wheel 10 via a drive rod 8 and a final gear 9. The vehicle 1B is a so-called automatic vehicle. The torque converter 31 transmits power between a pump impeller and a turbine runner via a fluid. A lockup clutch is annexed to the torque converter 31.

The lockup clutch, when engaged, directly couples the pump impeller to the turbine runner such that power is transmitted directly between the pump impeller and the turbine runner without passing through the fluid. As a result, fuel consumption accompanying driving of the vehicle is suppressed. When disengaged, the lockup clutch is capable of rotating relative to the pump impeller and the turbine runner, and in this state, power transmission between the pump impeller and the turbine runner is performed solely via the fluid. At a low speed, vibration of the internal combustion engine 2 is easily transmitted to the vehicle via the lockup clutch. Therefore, the lockup clutch is disengaged at a low speed to release the direct coupling between the pump impeller and the turbine runner. A vehicle speed VSP serving as a boundary between engagement and disengagement of the lockup clutch will be referred to as a lockup OFF vehicle speed.

The vehicle 1B comprises a battery 21. Power from the battery 21 is supplied to a starter motor 23 via a starter motor drive relay 22. The starter motor 23 starts the internal combustion engine 2 by executing cranking on the internal combustion engine 2 using a power supply. The power of the battery 21 is supplied to a first electric load 26 via a DC/DC converter 25 or to a second electric load 27 directly. The second electric load 27 includes a headlamp, for example. The DC/DC converter 25 regulates a voltage of the battery 21 to a fixed voltage.

The vehicle 1B also comprises an alternator 24 that is driven by the internal combustion engine 2 to perform power generation. Alternating current power generated by the alternator 24 is converted into a direct current by an inbuilt inverter, and then stored in the battery 21. Fuel injection by the fuel injector 3 of the internal combustion engine 2, ignition by the spark plug 4, and an operation of the starter motor 23 via the starter motor drive relay 22 are respectively controlled by an engine controller 11.

The engine controller 11 is constituted by a microcomputer comprising a central processing unit (CPU), a read-only memory (ROM), a random access memory (RAM), and an input/output interface (I/O interface). The engine controller 11 may be constituted by a plurality of microcomputers.

A signal indicating a brake fluid pressure of a brake of the vehicle 1B, detected by a brake switch 15, a signal indicating a crank angle, detected by a crank angle sensor 16, a signal indicating the vehicle speed VSP, detected by a vehicle speed sensor 17, and a signal indicating a front-rear direction incline angle of the vehicle, detected by an incline sensor 18, are input into the engine controller 11. The crank angle signal is also used as a signal representing a rotation speed Ne of the internal combustion engine 2. An incline sensor disclosed in the aforementioned Japanese Patent Application Publication No. 2008-14193, for example, may be used as the incline sensor 18. In the following description, the front-rear direction incline angle of the vehicle will be referred to simply as a front-rear gradient.

The brake switch 15 is not a mechanical switch but a software switch constituted by a pressure sensor or the like that outputs an OFF signal when the brake fluid pressure is equal to or smaller than a fluid pressure threshold and outputs an ON signal when the brake fluid pressure exceeds the fluid pressure threshold. When the brake fluid pressure is equal to or smaller than the fluid pressure threshold, this corresponds to a state in which a brake pedal is not depressed.

The engine controller 11 controls a fuel supply amount and a supply timing from the fuel injector 3 and an ignition timing by the spark plug 4 in accordance with a depression amount of an accelerator pedal of the vehicle 1B.

Further, to reduce the fuel consumption, when a first automatic stopping condition is established during a vehicle stoppage, the engine controller 11 automatically stops the internal combustion engine 2. Furthermore, to increase opportunities for automatically stopping the internal combustion engine 2, the engine controller 11 automatically stops the internal combustion engine 2 when a second automatic stopping condition is established while the vehicle 1B travels. It should be noted, however, that in both cases, automatic stopping is performed only when a warming operation of the internal combustion engine 2 is complete.

The engine controller 11 automatically stops the internal combustion engine 2 both during a stoppage and during travel by stopping fuel injection by the fuel injector 3 and ignition by the spark plug 4. This operation will be referred to as a fuel cut. A fuel cut means that driving of the internal combustion engine 2 is stopped without stopping rotation of the internal combustion engine 2. Therefore, the internal combustion engine 2 may continue to rotate through inertia even after the internal combustion engine 2 has been automatically stopped by a fuel cut.

In a period where the internal combustion engine 2 is automatically stopped, fuel is not consumed, and therefore the fuel consumption can be reduced by automatic stopping.

When, in a state where the internal combustion engine 2 has been automatically stopped following establishment of the first automatic stopping condition, a first restarting condition of the internal combustion engine 2 is established, the engine controller 11 cranks the internal combustion engine 2 by activating the starter motor 23, and restarts fuel injection by the fuel injector 3 and ignition of the injected fuel by the spark plug 4. As a result, the internal combustion engine 2 is restarted from a stopped state.

When a second restarting condition is established in a state where the internal combustion engine 2 has been automatically stopped following establishment of the second automatic stopping condition, the internal combustion engine 2 is restarted similarly.

In other words, when the first automatic stopping condition is established during a vehicle stoppage such that the internal combustion engine 2 is automatically stopped, the engine controller 11 does not restart the internal combustion engine 2 even following establishment of the second restarting condition. The engine controller 11 restarts the internal combustion engine 2 only when the first restarting condition is established.

Similarly, when the second automatic stopping condition is established while the vehicle 1B travels such that the internal combustion engine 2 is automatically stopped, the engine controller 11 does not restart the internal combustion engine 2 even following establishment of the first restarting condition. The engine controller 11 restarts the internal combustion engine 2 only when the second restarting condition is established.

Hence, when the second automatic stopping condition is established while the vehicle 1B travels such that the internal combustion engine 2 is automatically stopped and the vehicle 1B stops in that state, automatic stoppage of the internal combustion engine 2 is continued until the second restarting condition is established, regardless of whether or not the first restarting condition is established. The engine controller 11 then restarts the internal combustion engine 2 when the second restarting condition is established while the vehicle 1B is stationary.

By automatically stopping the internal combustion engine 2 both when the vehicle 1B is traveling and when the vehicle 1B is stationary, a stopping time of the internal combustion engine 2 can be increased in comparison with a case where the internal combustion engine 2 is automatically stopped only when the vehicle 1B is stationary, and as a result, the fuel consumption can be reduced correspondingly. When the internal combustion engine 2 is automatically stopped during vehicle travel, however, since the internal combustion engine 2 thereafter does not generate creep torque, a deceleration sensation may increase in an extremely low speed region, causing the driver to experience a feeling of unease.

Hence, in this automatic stopping device, a vehicle front-rear gradient is included in each of the first automatic stopping condition, the second automatic stopping condition, the first restarting condition, and the second restarting condition, and different gradient conditions are applied to each.

These conditions will be described below.

The second automatic stopping condition applied while the vehicle 1B travels is established when following conditions (1) to (3) are all satisfied.

(1) The brake pedal is depressed, or in other words the brake switch 15 is ON.
(2) The vehicle speed VSP is not higher than the lockup OFF vehicle speed.
(3) The front-rear gradient is not higher than a second gradient threshold.

The second restarting condition, which is determined after the internal combustion engine 2 has been automatically stopped on the basis of the second automatic stopping condition, is established when a following condition (11) is satisfied.

(11) The brake pedal is returned, or in other words the brake switch 15 is OFF.

Further, the first automatic stopping condition applied while the vehicle 1B is stationary is established when following conditions (21) to (23) are all satisfied.

(21) The brake pedal is depressed.
(22) The vehicle speed VSP is at or in the vicinity of 0 km/hr.
(23) The front-rear gradient is no higher than a first gradient threshold.

The first restarting condition, which is determined after the internal combustion engine 2 has been automatically stopped on the basis of the first automatic stopping condition, is established when the same condition (11) as that of the second restarting condition is satisfied.

Including the condition (23) relating to the front-rear gradient in the first automatic stopping condition, including the condition (3) relating to the front-rear gradient in the second automatic stopping condition, and setting the second gradient threshold to be smaller than the first gradient threshold are the principal features of this engine automatic stopping device.

Figure 2:
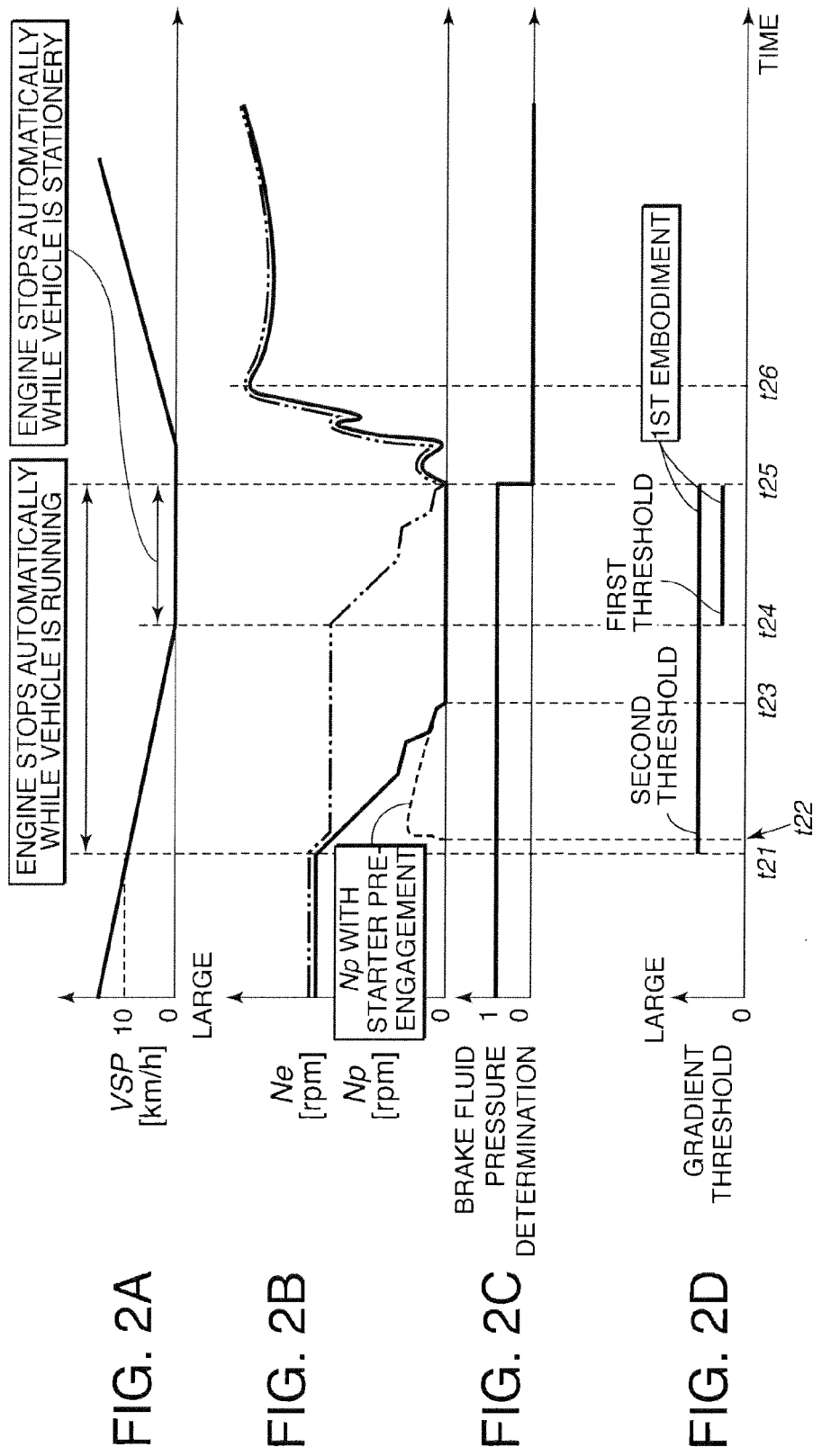
FIGS. 2A to 2D are timing charts illustrating operation states of the internal combustion engine controlled by the automatic stopping device.

Referring to FIGS. 2A to 2D, a case in which the internal combustion engine 2 is automatically stopped during a vehicle stoppage and a case in which the internal combustion engine 2 is automatically stopped while the vehicle 1B travels will be described. It should be noted that for ease of comparison, automatic stoppage of the internal combustion engine 2 during a vehicle stoppage and automatic stoppage of the internal combustion engine 2 during travel are together in FIGS. 2A to 2D. In reality, however, the two cases are not performed simultaneously. A solid line in FIG. 2B shows variation in the engine rotation speed Ne when the internal combustion engine 2 is automatically stopped on the basis of the second automatic stopping condition, which is applied while the vehicle 1B travels. A dot-dot-dash line in FIG. 2B shows variation in the engine rotation speed Ne when the internal combustion engine 2 is automatically stopped on the basis of the first automatic stopping condition, which is applied while the vehicle 1B is stationary.

FIGS. 2A to 2D show variation in the vehicle speed VSP, the internal combustion engine rotation speed Ne, a pinion rotation speed Np, a brake fluid pressure determination, and the front-rear gradient threshold in a case where the vehicle 1B comprising the automatic transmission 32 decelerates slowly to a stop while coasting and is then restarted.

The solid line in FIG. 2B shows variation in the engine rotation speed Ne in a case where the second automatic stopping condition is established while the vehicle 1B travels such that the internal combustion engine 2 is stopped and then the second restarting condition is established such that the internal combustion engine 2 is restarted. The dot-dot-dash line in FIG. 2B shows variation in the engine rotation speed Ne in a case where the first automatic stopping condition is established while the vehicle 1B is stationary such that the internal combustion engine 2 is stopped and then the first restarting condition is established such that the internal combustion engine 2 is restarted. For convenience, both lines are drawn on the same diagram, but these two types of automatic stoppage are not performed in parallel simultaneously, and only one of the two types of automatic stoppage is executed.

When the driver depresses the brake pedal as the vehicle 1B travels, the brake fluid pressure exceeds a predetermined fluid pressure threshold, and therefore the brake switch 15 switches ON such that a brake oil pressure determination flag is switched from 0 to 1. The second automatic stopping condition is established at a time t21, where the vehicle speed VSP decreases to a lockup OFF vehicle speed that is set to be slightly exceeding 10 kilometers per hour (10 km/hr). Accordingly, the engine controller 11 automatically stops the internal combustion engine 2 by performing a fuel cut. Correspondingly, the engine rotation speed Ne decreases rapidly from the time t21. At a time t23, the engine rotation speed Ne reaches zero. In other words, the internal combustion engine 2 stops rotating.

At a time t22 immediately after the fuel cut, starter pre-engagement begins. Starter pre-engagement is an operation to pre-mesh a pinion of the starter motor 23 and a ring gear of the internal combustion engine 2 in advance in preparation for restarting the internal combustion engine 2. This operation is conducted by the engine controller 11.

Starter pre-engagement will now be described. A flywheel is fixed to a rear end of a crankshaft of the internal combustion engine 2. The ring gear is formed on an outer periphery of the flywheel. Upon reception of a startup request, the starter motor 23 drives the ring gear to rotate by meshing the pinion to the ring gear. This operation is known as cranking of the internal combustion engine 2.

The pinion of the starter motor 23 is normally not meshed to the ring gear. A certain amount of time is required to mesh the pinion to the ring gear. However, when the internal combustion engine 2 is restarted after being automatically stopped, it is desirable to perform cranking as early as possible. In response to this requirement, starter pre-engagement is performed to intermesh the pinion and the ring gear of the starter motor 23 in advance in response to disengagement of the torque converter 31. Hence, when a restarting request is issued in relation to the internal combustion engine 2, the pinion is already meshed to the ring gear, and therefore cranking can be started immediately.

At a time t24, the vehicle speed reaches zero, and the internal combustion engine 2 is maintained in a stopped state thereafter.

Next, when the driver removes his/her foot from the brake pedal at a time t25 in order to restart the vehicle 1B, the brake fluid pressure falls to or below the fluid pressure threshold such that the brake switch 15 switches OFF. As a result, the brake fluid pressure determination flag switches from 1 to 0. At this timing, the second restarting condition is established.

When the second restarting condition is established, the engine controller 11 cranks the internal combustion engine 2 by driving the starter motor 23 via the starter motor drive relay 22, and restarts fuel injection into the internal combustion engine 2 by the fuel injector 3 and ignition by the spark plug 4. When the internal combustion engine 2 is restarted, the engine rotation speed Ne increases rapidly. At a time t26 following complete explosion in the internal combustion engine 2, the engine rotation speed Ne settles at an idle rotation speed.

When the engine rotation speed Ne increases, the power of the internal combustion engine 2 is transmitted to the drive wheel 10, and as a result, the vehicle speed VSP increases.

Next, a case in which the second automatic stopping condition is not established while the vehicle 1B travels, and instead, the internal Combustion engine 2 is stopped following establishment of the first automatic stopping condition after the vehicle 1B stops, whereupon the internal combustion engine 2 is restarted following establishment of the first restarting condition, will be described. As noted above, this case corresponds to the dot-dot-dash line in FIG. 2B.

The vehicle speed VSP may fall to zero in a case where the internal combustion engine 2 continues to rotate but the second automatic stopping condition is not established during vehicle travel. This may occur when, for example, the road gradient is between the second gradient threshold and the first gradient threshold, the vehicle speed decreases without depression of the brake pedal on an uphill slope, and so on. In this case, the first automatic stopping condition is established at the time t24.

When the first automatic stopping condition is established at the time t24, the engine controller 11 automatically stops the internal combustion engine 2 by performing a fuel cut.

After the internal combustion engine 2 has been automatically stopped upon establishment of the first automatic stopping condition, the driver starts the vehicle 1B at the time t25 by removing his/her foot from the brake pedal such that the brake fluid pressure falls to or below the fluid pressure threshold and the brake switch 15 switches OFF. As a result, the brake fluid pressure determination flag switches from 1 to 0. At this timing, the first restarting condition is established.

When the first restarting condition is established, the engine controller 11 restarts the internal combustion engine 2 at the time t25.

As described above, the second automatic stopping condition is established for a period extending from the time t21 to the time t25, while the first automatic stopping condition is established for a period extending from the time t24 to the time t25. By automatically stopping the internal combustion engine 2 not only during a vehicle stoppage but also while the vehicle 1B travels, a fuel cut is executed in the period extending from the time t21 to the time t24, and as a result, the fuel consumption can be suppressed.

Figure 3:
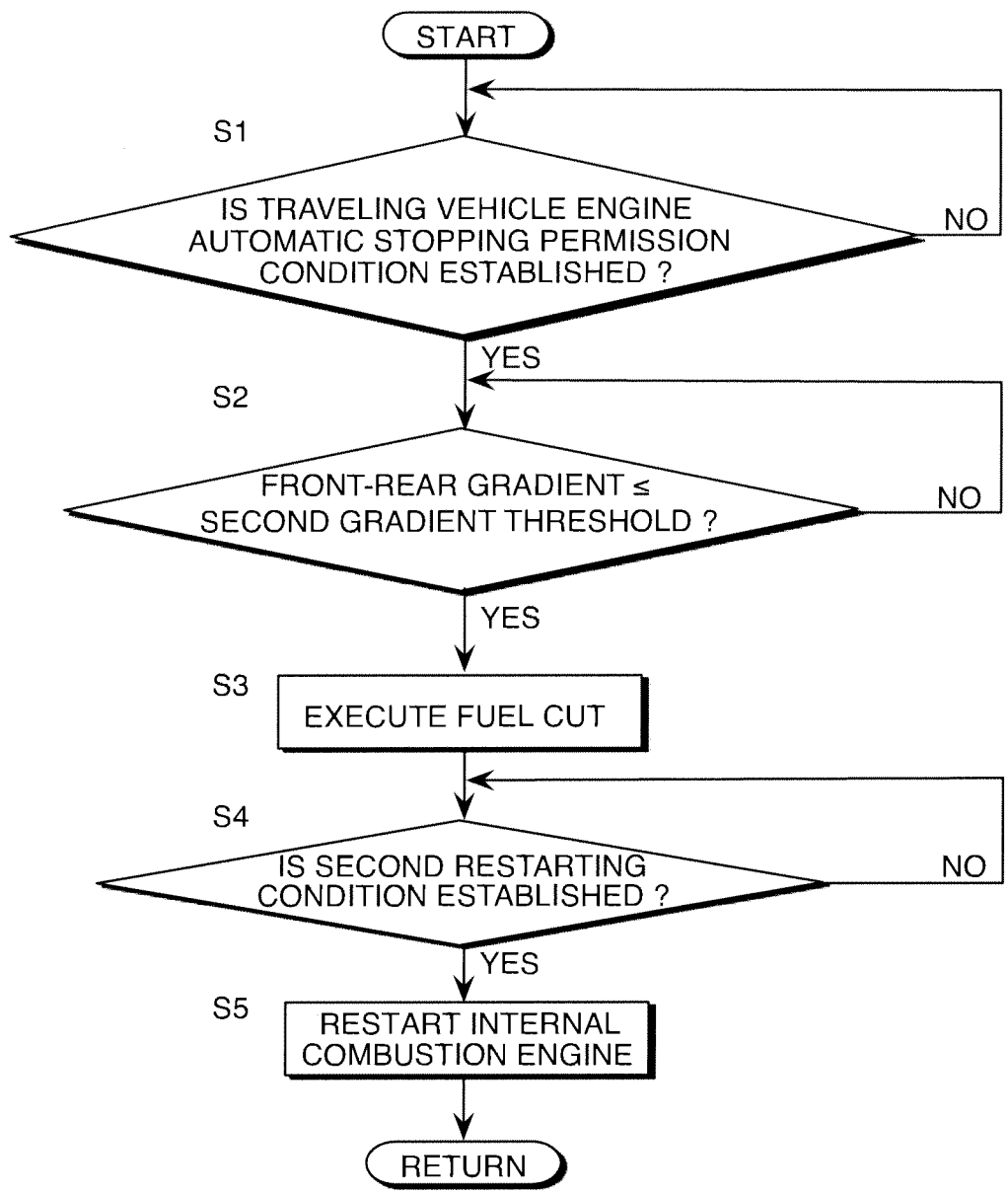
FIG. 3 is a flowchart illustrating an automatic stopping routine executed on the internal combustion engine during vehicle travel by a controller according to the first embodiment of this invention.

Referring to FIG. 3, a routine executed by the engine controller 11 to automatically stop the internal combustion engine 2 when the vehicle 1B is traveling in order to realize the above control will be described. This routine is executed repeatedly while the vehicle 1B travels by starting a new routine at the same time as a previous routine ends.

In steps S1 and S2, the engine controller 11 determines whether or not the second automatic stopping condition applied while the vehicle 1B travels is established. Here, the three conditions (1) to (3) are grouped into two groups, namely the conditions (1) and (2) and the condition (3).

In the step S1, the engine controller 11 determines whether or not the conditions (1) and (2) are both satisfied. Here, the conditions (1) and (2) will be referred to collectively as a traveling vehicle engine automatic stopping permission condition. When the determination is negative, the engine controller 11 waits until the determination becomes affirmative before advancing to the following step S2.

When the determination of the step S1 becomes affirmative, the engine controller 11 determines in the step S2 whether or not the condition (3) is satisfied, or in other words whether or not the front-rear gradient of the vehicle 1B is equal to or smaller than the second gradient threshold.

While the determination of the step S2 remains negative, the engine controller 11 waits without advancing to a following step S3.

When the determination of the step S2 is affirmative, the engine controller 11 executes a fuel cut in the step S3. After executing the fuel cut in the step S3, the engine controller 11 performs processing of a step S4.

In the step S4, the engine controller 11 determines whether or not the second restarting condition is established. The second restarting condition is established when the condition (11) is satisfied.

When the second restarting condition is established in the step S4, the engine controller 11 restarts the internal combustion engine 2 in a step S5. More specifically, the engine controller 11 cranks the internal combustion engine 2 by driving the starter motor 23 via the starter motor drive relay 22, and restarts fuel injection into the internal combustion engine 2 by the fuel injector 3 and ignition by the spark plug 4. Following the processing of the step S5, the engine controller 11 terminates the routine. It should be noted that when the routine is complete, the engine controller 11 immediately begins execution of the next routine.

When, on the other hand, the second restarting condition is not established in the step S4, the engine controller 11 waits until the second restarting condition is established.

Next, referring to FIG. 4, a routine executed by the engine controller 11 to automatically stop the internal combustion engine 2 when the vehicle 1B is stationary will be described. The routine is likewise executed repeatedly while the vehicle 1B is stationary by starting a new routine at the same time as a previous routine is terminated.

It is assumed that the engine controller 11 determines whether the vehicle 1B is traveling or stationary on the basis of the vehicle speed VSP detected by the vehicle speed sensor 17.

Figure 4:
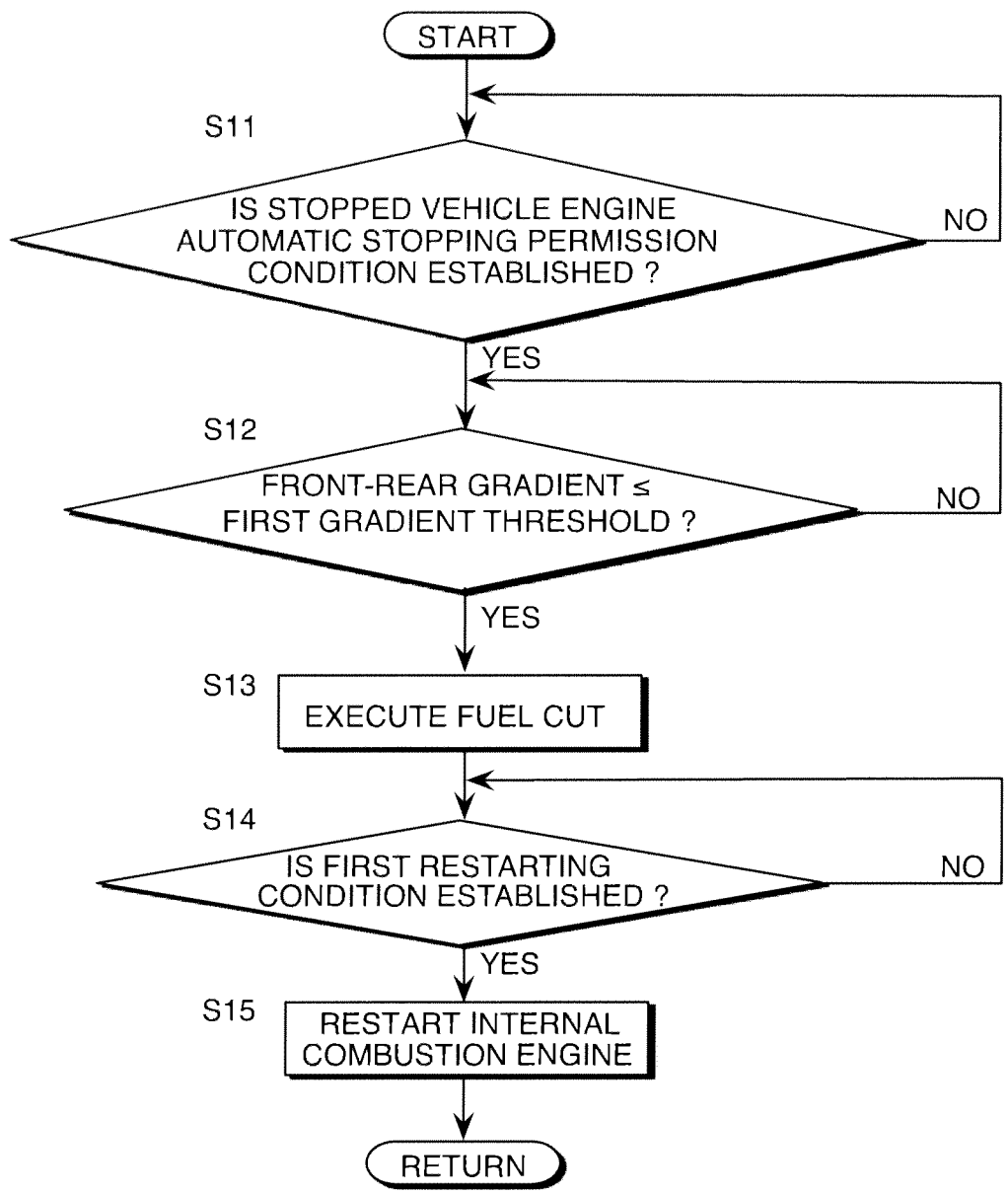
FIG. 4 is a flowchart illustrating an automatic stopping routine executed on the internal combustion engine during a vehicle stoppage by the controller.
Figure 5:
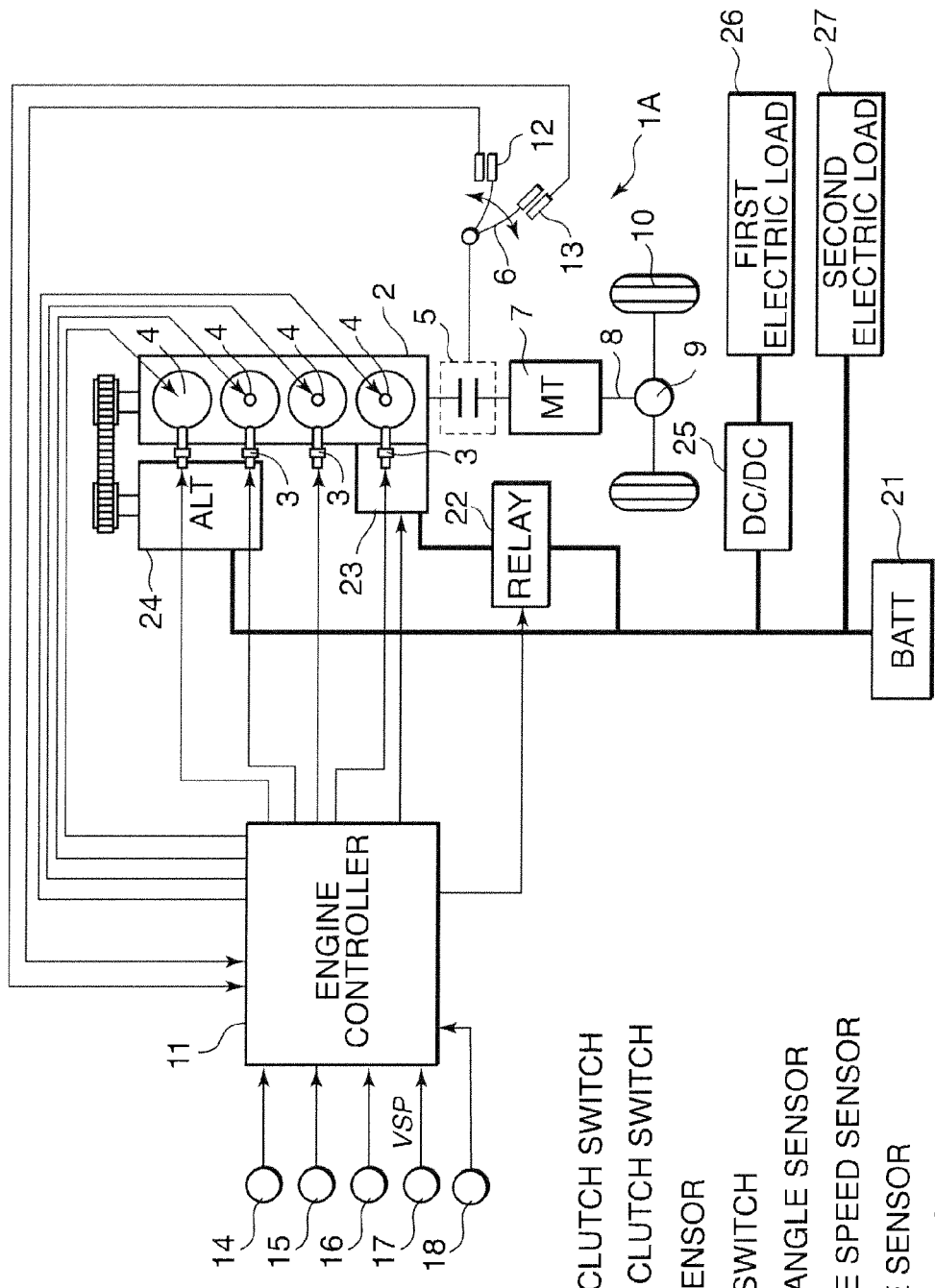
FIG. 5 is similar to FIG. 1, but shows a second embodiment of this invention.

Processing content of the routine in FIG. 4 is substantially identical to that of the routine in FIG. 3 for automatically stopping the internal combustion engine 2 during travel.

Hence, in steps S11 and S12, the engine controller 11 determines whether or not the first automatic stopping condition is established. Here, the three conditions (21) to (23) are grouped into two groups, namely the conditions (21) and (22) and the condition (23).

First, in the step S11, the engine controller 11 determines whether or not the conditions (21) and (22) are both satisfied. Here, the conditions (21) and (22) will be referred to collectively as a stopped vehicle engine automatic stopping permission condition. Therefore, establishment of the stopped vehicle engine automatic stopping permission condition means that the conditions (21) and (22) are both satisfied.

While the determination of the step S11 remains negative, the engine controller 11 waits without advancing to the following step S12.

When the determination of the step S11 becomes affirmative, the engine controller 11 determines in the step S12 whether or not the condition (23) is satisfied, or in other words whether or not the front-rear gradient is equal to or smaller than the first gradient threshold. As described above, the second gradient threshold is set to be smaller than the first gradient threshold. In other words, the first gradient threshold is greater than the second gradient threshold. When the front-rear gradient is equal to or smaller than the first gradient threshold, the engine controller 11 executes a fuel cut in a step S13. When the front-rear gradient is greater than the first gradient threshold, the engine controller 11 waits without performing the processing of the step S13.

After executing the fuel cut in the step S13, the engine controller 11 performs processing of a step S14.

In the step S14, the engine controller 11 determines whether or not the first restarting condition is established. The first restarting condition is established when the condition (11) is satisfied.

When the first restarting condition is established in the step S14, the engine controller 11 restarts the internal combustion engine 2 in a step S15. More specifically, the engine controller 11 cranks the internal combustion engine 2 by driving the starter motor 23 via the starter motor drive relay 22, and restarts fuel injection into the internal combustion engine 2 by the fuel injector 3 and ignition by the spark plug 4. Following the processing of the step S15, the engine controller 11 terminates the routine. It should be noted that when the routine is complete, the engine controller 11 immediately begins execution of the next routine.

When, on the other hand, the first restarting condition is not established in the step S14, the engine controller 11 waits until the first restarting condition is established.

The automatic stopping routine of FIG. 3, which is executed on the internal combustion engine 2 while the vehicle 1B travels, and the automatic stopping routine of FIG. 4, which is executed on the internal combustion engine 2 while the vehicle 1B is stationary, are executed selectively in accordance with the vehicle speed VSP at the start of execution of the routine. Once execution of one of the routines has started, the other routine is not executed until the routine is complete. Hence, when the routine of FIG. 3 for automatically stopping the internal combustion engine 2 while the vehicle 1B travels is executed, execution of this routine is continued even if the vehicle 1B subsequently stops.

As described above, in this engine automatic stopping device, the front-rear gradient of the vehicle 1B is required to be equal to or smaller than the first gradient threshold to satisfy the first automatic stopping condition for stopping the internal combustion engine 2 while the vehicle 1B is stationary. Further, the front-rear gradient of the vehicle 1B is required to be equal to or smaller than the second gradient threshold to satisfy the second automatic stopping condition for stopping the internal combustion engine 2 while the vehicle 1B travels. The second gradient threshold is set to be smaller than the first gradient threshold. As a result of this setting, a feeling of unease experienced by the driver when the internal combustion engine 2 stops while traveling on a slope can be suppressed.

Referring to FIG. 5 and FIGS. 6A to 6G, a second embodiment of this invention will be described.

This embodiment is applied to a vehicle 1A comprising a manual transmission 7, a clutch 5, and a clutch pedal 6 instead of the automatic transmission 31 and the torque converter 32. The vehicle 1A is a so-called manual vehicle.

The manual transmission 7 is connected to the internal combustion engine 2 via the clutch 5. The clutch 5 is engaged and disengaged using the clutch pedal 6. The clutch pedal 6 is provided with an upper clutch switch 12 and a lower clutch switch 13 to detect an engagement/disengagement state between the internal combustion engine 2 and the manual transmission 7.

The upper clutch switch 12 outputs an ON signal when the driver of the vehicle 1A releases his/her foot from the clutch pedal 6, or in other words when the internal combustion engine 2 and the manual transmission 7 are directly coupled. Further, the upper clutch switch 12 outputs an OFF signal when the driver depresses the clutch pedal 6 in order to block engagement between the internal combustion engine 2 and the manual transmission 7.

The lower clutch switch 13 outputs an ON signal when the driver depresses the clutch pedal 6 such that engagement between the internal combustion engine 2 and the manual transmission 7 is completely blocked. In other cases, for example in a half clutch state where the driver has returned the clutch pedal 6 partway, engagement between the internal combustion engine 2 and the manual transmission 7 is not completely blocked, and therefore the lower clutch switch 13 outputs an OFF signal.

In accordance with the differences in configuration described above, the first restarting condition and the second restarting condition according to the first embodiment are modified for application to the engine automatic stopping device according to this embodiment.

Specifically, depression of the clutch pedal 6 is required as the first restarting condition, and a shift position of the manual transmission 7 is required to be in a position other than neutral as the second restarting condition. Further, as the second restarting condition, the clutch pedal 6 is required to be depressed and the brake pedal is required not to be depressed, or the accelerator pedal is required to be depressed. According to the second restarting condition, the internal combustion engine 2 is maintained in the stopped state until a point immediately before the vehicle 1A starts or accelerates.

By maintaining the internal combustion engine 2 in the stopped state until a point immediately before the vehicle 1A starts or accelerates in this manner, the stopping time of the internal combustion engine 2 is increased, which is favorable in terms of reducing the fuel consumption. However, when the stopping time of the internal combustion engine 2 increases on an uphill or downhill slope, the driver may experience a feeling of unease, and this feeling of unease increases as the incline of the slope becomes steeper.

In this embodiment, therefore, similarly to the first embodiment, a limitation is applied to automatic stoppage of the internal combustion engine 2 on a slope by requiring the road gradient to be equal to or smaller than the first gradient threshold as the first automatic stopping condition applied while the vehicle 1A is stationary and requiring the road gradient to be equal to or smaller than the second gradient threshold as the second automatic stopping condition applied while the vehicle 1A travels.

The first automatic stopping condition, second automatic stopping condition, first restarting condition, and second restarting condition applied to the engine automatic stopping device according to this embodiment will now be described.

The second automatic stopping condition applied while the vehicle 1A travels is established when following conditions (1) to (5) are all satisfied.

(1) The brake pedal is depressed, or in other words the brake switch 15 is ON.
(2) The shift position of the manual transmission 7 is in a position other than neutral.
(3) The clutch pedal 6 is depressed and the clutch 5 is completely disengaged, or in other words the lower clutch switch 13 is ON.
(4) The vehicle speed VSP is no higher than a predetermined vehicle speed, for example 10 km/hr.
(5) The front-rear gradient is equal to or smaller than the second gradient threshold.

The second restarting condition for restarting the internal combustion engine 2 after the internal combustion engine 2 has been stopped following establishment of the second automatic stopping condition is established when a condition (11) is satisfied and one of conditions (12) to (14) is satisfied.

(11) The shift position of the manual transmission 7 is in a position other than neutral.
(12) The clutch pedal 6 is depressed and the brake pedal is not depressed.
(13) The accelerator pedal is depressed.
(14) The front-rear gradient is greater than the second gradient threshold.

The first automatic stopping condition applied while the vehicle is stationary is established when following conditions (21) to (24) are all satisfied.

(21) The shift position of the manual transmission 7 is in the neutral position.
(22) The clutch pedal 6 is returned and the clutch 5 is engaged, or in other words the lower clutch switch 13 is OFF.
(23) The vehicle speed VSP is at or in the vicinity of 0 km/hr.
(24) The front-rear gradient is equal to or smaller than the first gradient threshold.

The first restarting condition for restarting the internal combustion engine 2 after the internal combustion engine 2 has been stopped following establishment of the first automatic stopping condition is established when one of following conditions (31) and (32) is satisfied.

(31) The clutch pedal 6 is depressed.
(32) The front-rear gradient is greater than the first gradient threshold.

The engine controller 11 executes the automatic stopping routines of FIGS. 3 and 4 on the basis of these conditions in a similar manner to the first embodiment. It should be noted, however, that in the step S1, a determination is made as to whether or not all of the conditions (1) to (4) are satisfied. In the step S4, a determination is made as to whether or not the condition (11) and one of the conditions (12) to (14) are satisfied. In the step S11, a determination is made as to whether or not all of the conditions (21) to (23) are satisfied. In the step S14, a determination is made as to whether or not one of the conditions (31) and (32) is satisfied.

The processing of all other steps is identical to the first embodiment.

Referring to FIGS. 6A to 6G, likewise in this embodiment applied to the vehicle 1A, which is a so-called manual vehicle, by setting the second gradient threshold to be smaller than the first gradient threshold, similarly to the first embodiment, the feeling of unease experienced by the driver when the internal combustion engine 2 is stopped during travel on a slope can be suppressed.

The contents of Tokugan 2010-165712, with a filing date of Jul. 23, 2010 in Japan, are hereby incorporated by reference. Although the invention has been described above with reference to certain embodiments, the invention is not limited to the embodiments described above. Modifications and variations of the embodiments described above will occur to those skilled in the art, within the scope of the claims.

INDUSTRIAL FIELD OF APPLICATION

As described above, with the engine automatic stopping device according to this invention, an internal combustion engine of a vehicle can be automatically stopped and restarted without causing a driver to experience a feeling of unease on a slope. Therefore, a reduction in a fuel consumption of a vehicle can be realized easily.

The embodiments of this invention in which an exclusive property or privilege is claimed are defined as follows:

1. An engine automatic stopping device for an internal combustion engine of a vehicle, comprising a programmable controller programmed to:
   automatically stop the internal combustion engine when a first automatic stopping condition is established while the vehicle is stationary; and
   automatically stop the internal combustion engine when a second automatic stopping condition is established while the vehicle travels,
   wherein the first automatic stopping condition requires a road gradient equal to or smaller than a first positive gradient threshold, the second automatic stopping condition requires the road gradient equal to or smaller than a second positive gradient threshold, and the second gradient threshold is set at a smaller value than the first gradient threshold.

2. The engine automatic stopping device as defined in claim 1, wherein the vehicle comprises an automatic transmission, and a torque converter that connects the internal combustion engine to the automatic transmission.

3. The engine automatic stopping device as defined in claim 1, wherein the controller is further programmed to:
   restart the internal combustion engine when a first restarting condition is established after the internal combustion engine has been automatically stopped due to establishment of the first automatic stopping condition, wherein the vehicle comprises a manual transmission, a clutch that engages the internal combustion engine to the manual transmission, and a clutch pedal which, when depressed, blocks engagement between the internal combustion engine and the manual transmission by the clutch, the first restarting condition being set to be established when the clutch pedal is depressed; and
   restart the internal combustion engine when a second restarting condition is established after the internal combustion engine has been automatically stopped due to establishment of the second automatic stopping condition, wherein the vehicle comprises a brake pedal and an accelerator pedal, the second restarting condition being set to be established when, following depression of the clutch pedal, the brake pedal is released or the accelerator pedal is depressed.

4. An engine automatic stopping method for automatically stopping an internal combustion engine of a vehicle, comprising:
   automatically stopping the internal combustion engine when a first automatic stopping condition is established while the vehicle is stationary; and
   automatically stopping the internal combustion engine when a second automatic stopping condition is established while the vehicle travels,
   wherein the first automatic stopping condition requires a road gradient equal to or smaller than a first positive gradient threshold, the second automatic stopping condition requires the road gradient equal to or smaller than a second positive gradient threshold, and the second gradient threshold is set at a smaller value than the first gradient threshold.

5. An engine automatic stopping device for an internal combustion engine of a vehicle, comprising:
   means for automatically stopping the internal combustion engine when a first automatic stopping condition is established while the vehicle is stationary; and
   means for automatically stopping the internal combustion engine when a second automatic stopping condition is established while the vehicle travels,
   wherein the first automatic stopping condition requires a road gradient equal to or smaller than a first positive gradient threshold, the second automatic stopping condition requires the road gradient equal to or smaller than a second positive gradient threshold, and the second gradient threshold is set at a smaller value than the first gradient threshold.

6. An engine automatic stopping device for an internal combustion engine of a vehicle, comprising a programmable controller programmed to:
   automatically stop the internal combustion engine when a first automatic stopping condition is established while the vehicle is stationary; and
   automatically stop the internal combustion engine when a second automatic stopping condition is established while the vehicle travels,
   wherein the first automatic stopping condition requires a road gradient equal to or smaller than a first gradient threshold, the second automatic stopping condition requires the road gradient equal to or smaller than a second gradient threshold, and a magnitude of the second gradient threshold is set at a smaller value than a magnitude of the first gradient threshold.

7. The engine automatic stopping device as defined in claim 6, wherein the vehicle comprises an automatic transmission, and a torque converter that connects the internal combustion engine to the automatic transmission.

8. The engine automatic stopping device as defined in claim 6, wherein the controller is further programmed to:
   restart the internal combustion engine when a first restarting condition is established after the internal combustion engine has been automatically stopped due to establishment of the first automatic stopping condition, wherein the vehicle comprises a manual transmission, a clutch that engages the internal combustion engine to the manual transmission, and a clutch pedal which, when depressed, blocks engagement between the internal combustion engine and the manual transmission by the clutch, the first restarting condition being set to be established when the clutch pedal is depressed; and restart the internal combustion engine when a second restarting condition is established after the internal combustion engine has been automatically stopped due to establishment of the second automatic stopping condition, wherein the vehicle comprises a brake pedal and an accelerator pedal, the second restarting condition being set to be established when, following depression of the clutch pedal, the brake pedal is released or the accelerator pedal is depressed.

* * * * *